Dec. 19, 1922. 1,439,294.
E. COURANT ET AL.
TRACTOR WITH TRAILER AND CONNECTION.
FILED FEB. 6, 1920. 4 SHEETS—SHEET 1.

Patented Dec. 19, 1922.

1,439,294

UNITED STATES PATENT OFFICE.

EMILE COURANT AND EUGÈNE AUBRY, OF ANTWERP, BELGIUM.

TRACTOR WITH TRAILER AND CONNECTION.

Application filed February 6, 1920. Serial No. 356,779.

*To all whom it may concern:*

Be it known that we, EMILE COURANT, a subject of the King of the Belgians, residing at Antwerp, Belgium, 122 Rue du Palais, and EUGÈNE AUBRY, a subject of the King of the Belgians, residing at Antwerp, Belgium, 19 Avenue de France, have invented an Improved Tractor with Trailer and Connection, of which the following is a specification.

The object of the present invention is to obtain a mechanical tractor by means of which it is possible efficaciously to replace the horse, that is to say:

(1°) that it must be possible to connect and disconnect it in a simple, safe and quick way;

(2°) it must be a carriage taking as little space as possible and easy to handle;

(3°) only one man, the driver, must be necessary in order to drive it, to connect it with or to disconnect it from the trailer, just as only one attendant is necessary for the horse;

(4°) one tractor must be able to be used for several trailers in order to intensify its service and to avoid waiting during the loading and unloading of the trailers;

(5°) the disconnected trailer itself must be a carriage with four wheels easily movable whether it is loaded or not and it must be possible to use it for animal traction.

The present invention is principally characterized by the fact that the fore-wheels or bogie of the trailer when the latter is connected to the tractor substantially becomes an integral part of the latter, that is to say that the tractor and the trailer then form a single carriage. To this effect means are provided to fix the bogie of the trailer in position in the back part of the frame of the tractor and the wheels of the said bogie can be raised independently from the bogie which remains in stable position with relation to the trailer, being thus differentiated from former inventions in which the wheels can only be raised by moving the whole of the bogie.

The invention also provides means to obtain the alignment of the tractor and trailer when they are being connected and means permitting the connection and disconnection of the tractor and the trailer and the raising and lowering of the wheels, without the driver having to leave his seat.

As the bogie of the trailer substantially forms an integral part of the tractor when the two are connected, the point of traction is situated at the pivot connecting the bogie of the trailer to the frame of the latter, and the said pivot, being according to the present invention perpendicular to the axis of the axle of the driving wheels of the tractor and in the same vertical plane when the trailer is connected, great advantages as to the distribution of the weight and the adherence of the wheels on the road are obtained.

In the following description reference is made to the accompanying drawings, in which.

Figure 1:
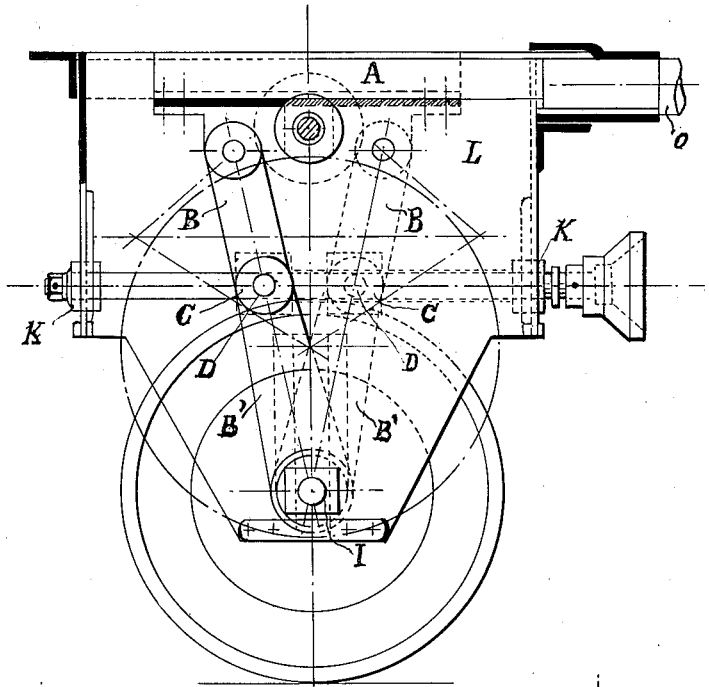
Fig. 1 shows the fore-wheels or bogie of the trailer, one half being a longitudinal section and the other half being a side elevation.
Figure 2:
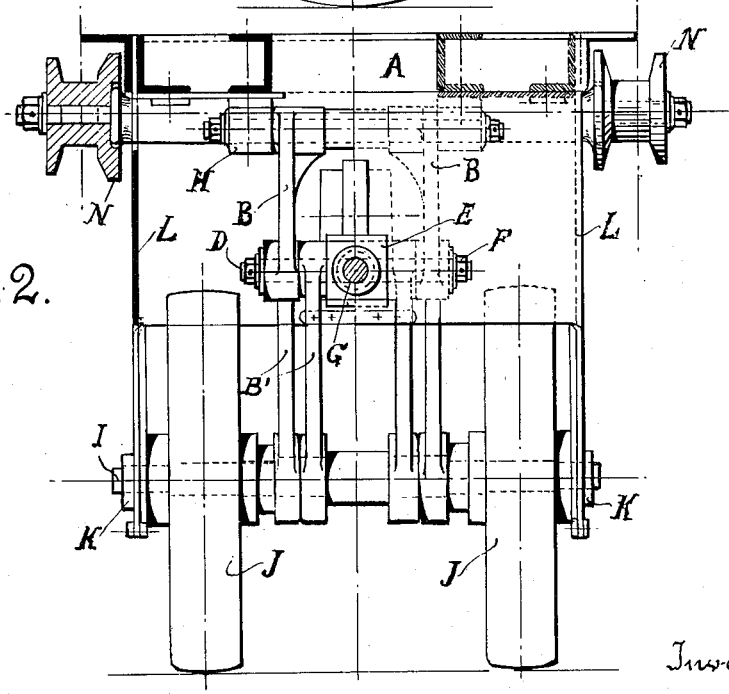
Fig. 2 shows the same bogie partly in transverse section and partly as a front view.

Referring to Figs. 1 and 2, the plate or table A of the bogie of the trailer rests on the axle I by means of the intermediate connecting rods B, B' which are connected to one another by means of a joint. The joints C are obtained by mounting the connecting rods on parallel shafts D, the central part of which consists of a nut E and the extremities of which are threaded and provided with a nut and a taper or split pin F. The nuts E of the shafts D are provided with a threaded hole in order to fit a screw G which passes through them and which is threaded in opposite directions starting from its centre. The upper end of the connecting rods B are carried by a shaft which is supported in brackets H fixed to the plate A of the bogie of the trailer.

The lower end of the connecting rods B' carries the wheel axle I, one pair of connecting rods being keyed on the said axle. The axle I carries the wheels J which are able to rotate freely. The ends of the axle I and the screw G are carried in bearings K which slide in slides cut in a plate casing L which contains all the parts of the mechanism and gives the whole the desired stability. When the screw G is rotated the ends of the connecting rods B and B' move away from each other at their joining point and in consequence the axle I carrying the wheels J rises and comes in the position indicated in dot and dash lines on Fig. 1. The slides in the plate casing L make it possible for the ends of the axle I and those of the screw G to rise independently from the said casing.

The central part of the screw G constitutes an abutment block M' against which the nuts E are stopped when the wheels are fully lowered. It is therefore possible for the driver to know that they have reached that position, that is to say, that the axes of the connecting rods B and B' form a straight line, as he is unable to go on rotating the screw G.

The upper part of the plate sides of the bogie of the trailer carry in their centre and on the same vertical axis as the axle I rollers N, and the bogie is moreover provided with a pole O. The plate or table A, formed by the plate casing carries another wooden plate or table provided with the flat metal circles which make it possible for the bogie to rotate with relation to the frame of the trailer.

Figure 3:
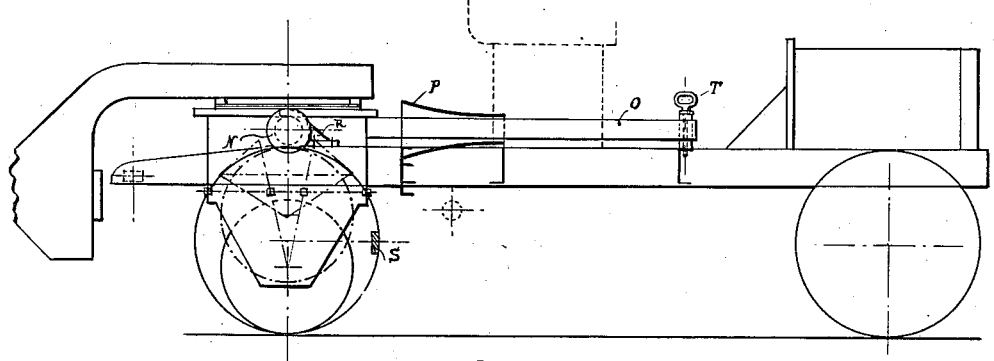
Figs. 3 and 4 show respectively a sectional elevation and a plan of the devices provided according to the present invention to obtain the alignment of the trailer and tractor, that is to say the direction of the tractor with relation to the trailer, when the two are being connected.
Figure 4:
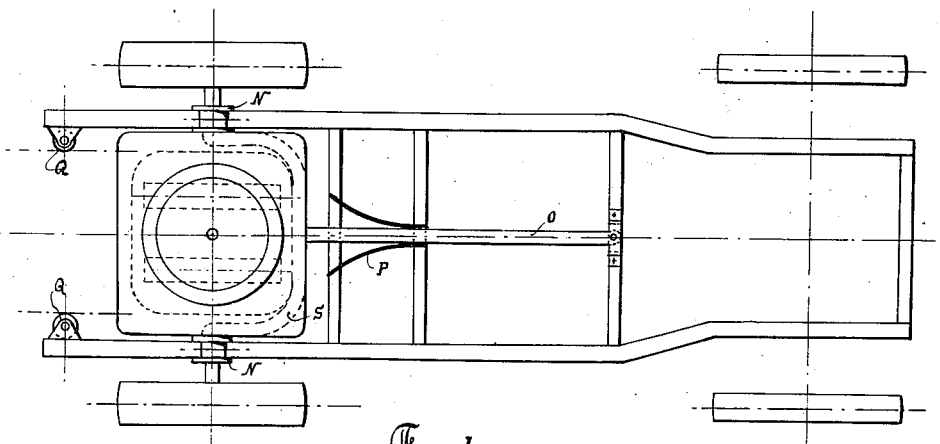

Figs. 3 and 4 show the device for guiding the bogie of the trailer when it is being connected to the back part of the frame of the tractor. When he wishes to connect the trailer to the tractor the driver makes the tractor move backwardly after having placed the pole O approximatively in the right direction. When the tractor moves backwardly, the end of the pole O enters firstly into a funnel or conical casting P fixed to the frame of the tractor. The pole 14 thereby comes in alignment with the central longitudinal axis of the tractor. Then the plate-casing of the bogie-part of the trailer engages itself in the back-part of the frame of the tractor and is to that effect guided by means of rollers Q fixed to the back ends of the longitudinal members of the tractor-frame and leaving between them a space equal to the width of the casing. The rollers N of the bogie of the trailer come on to slopes formed by the longitudinal members of the tractor-frame until they are stopped by hooks R. That position being reached, the axis of the axle of the bogie is in the same vertical plane as the axis of the driving wheels of the tractor, the axle S of which is bent in order to allow the introduction of the bogie-casing of the trailer into the back-part of the tractor.

Figure 5:
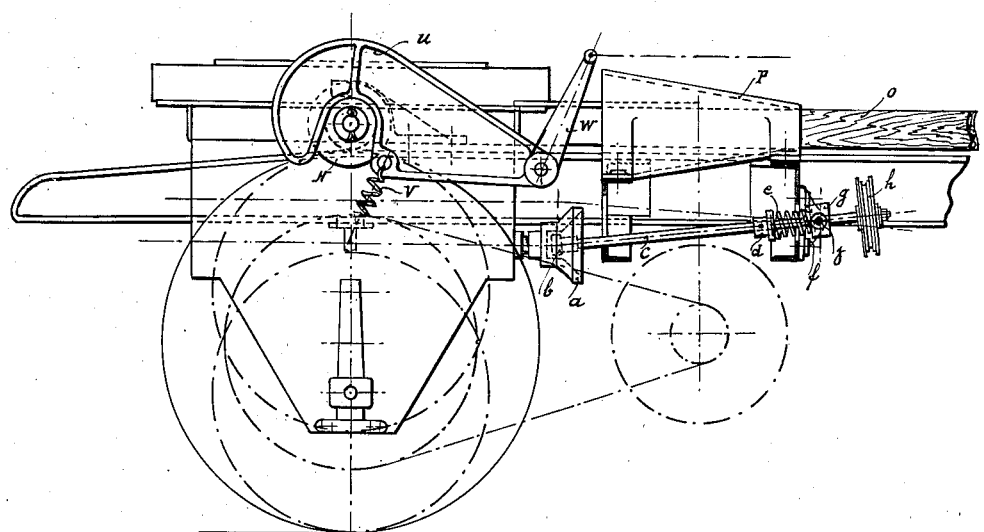
Fig. 5 shows a side elevation and Fig. 6 a plan of the device making it possible for the driver to raise and to lower the wheels of the bogie of the trailer without leaving his seat, Fig. 5 moreover showing a device for connecting the trailer to the tractor which also prevents the said trailer from becoming disconnected before that is required.

When the rollers N are under the hooks R, an eye provided at the end of the pole O comes exactly above the central hole of a casting fixed to the frame of the tractor, thereby making it possible for the driver to pass a pin T, which fixes the pole in position, through both. By running on the slopes at the back of the longitudinal members of the tractor frame, the rollers N push upwards, against the action of a spring V attached to the frame of the tractor, a hook U (Fig. 5) also fixed to the said frame, and engage themselves into a recess provided in the said hook U at the very moment when they are immobilized under the hooks R. When the rollers N snap into the recess of the hook U the latter falls under the action of the spring V and is then kept in that position thereby preventing the bogie of the trailer, and consequently the trailer itself from moving backwards until the hooks U are raised again, which the driver is able to do without leaving his seat by means of a connection rod W and any appropriate connection, such as for instance a chain or a cable.

Figure 6:
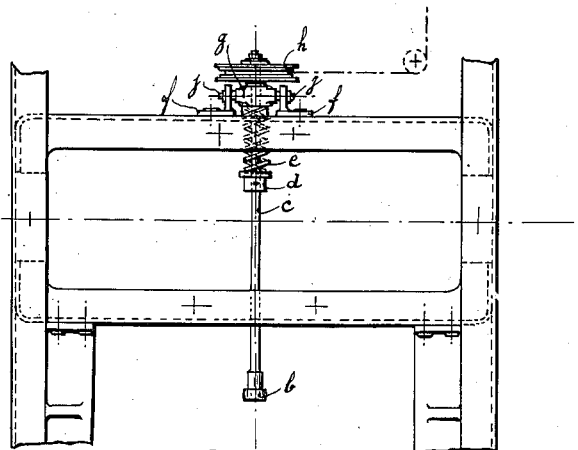

The pin T and the hooks U thus maintain the pole and the rollers of the bogie of the trailer in the connected position and in that way the said bogie of the trailer substantially forms an integral part of the frame of the tractor. It is to be observed that the hook U moved by the rollers N against the action of the spring V acts as a shock-absorber when the tractor and trailer are being connected, while the hooks R prevent the vertical movement of the rollers N. Once the trailer is connected, there only remains for the driver to raise the wheels J, which he is able to do without leaving his seat by means of the device shown by Figs. 5 and 6.

The frame of the tractor carries a shaft $c$ passing through two slides in the cross-members of the frame. One end of the said shaft $c$ forms a square block $b$ which can be inserted into a funnel-like casting $a$ having an appropriate cavity and fixed to the fore-end of the screw G of the bogie of the trailer. The parts $a$ and $b$ form thus a universal joint when the trailer is connected. The shaft $c$ is able to slide and rotate in a bearing $g$, the sliding motion being effected against the action of the spring $e$ maintained by means of the sleeve $d$ fixed on the shaft $c$. The bearing $g$ is provided with two cylindrical lugs $j$ which are able to rotate in two brackets $f$ fixed to one of the transverse members of the frame. The square block $b$ at the end of the shaft $c$ is thus allowed owing to the lugs $j$ to move in the median vertical plane, the shaft *c* being guided in the slide *i* in one of the cross members of the frame. The extremity of the shaft *c* opposed to the square block *b* is provided with a chain or sprocket wheel *h*, the chain of which passes by means of any suitable known device on a second wheel which can be rotated by means of a hand wheel or a crank handle within reach of the driver. When the driver rotates the said handwheel and consequently the wheel *h*, the shaft *c* communicates, by means of the universal joint, its rotation to the screw G of the bogie of the trailer, with the result that the connecting rods B and B' are bent at the joints C. The wheels J of the bogie of the trailer are consequently raised. It should be observed that if the respective squares of the blocks *b* of the shaft *c* and of the cavity of the funnel-like casting *a* did not exactly correspond when the tractor and trailer are being connected, the shaft *c* would be pushed forward and the spring *e* would be compressed. But, as soon as the driver operates the chain wheel *h* by means of the hand wheel or like means, the spring *e* will extend and compel the square block *b* of the shaft *c* to enter into the cavity of the funnel-like casting *a* as soon as the shaft *c* will have been sufficiently rotated that the sides of their respective squares should correspond and fit each other.

*Connecting of the trailer and the tractor.*—When the driver wishes to connect the trailer he drives the tractor backwards so that the pole O is introduced into the funnel like casting P. The backward movement of the tractor being continued, the casing of the bogie is guided by means of the lateral rollers Q into the back part of the tractor frame and soon after the rollers of the bogie of the trailer come on to the slopes of the longitudinal members of the tractor-frame and stop under the hooks R at the same time that they snap into the recess of the hooks U.

The driver is then able to introduce the pin T both through the eye at the end of the pole and the central hole of a casting fixed to the tractor frame. The trailer now substantially forms an integral part of the tractor as well at the end of the pole as at the rollers of the bogie of the trailer.

The driver has then just only to raise the forewheels of the trailer by rotating the hand-wheel or like means which operates the shaft *c* and also, by means of the universal joint, the screw G of the bogie of the trailer.

*Disconnection of the trailer.*—In order to disconnect the trailer the driver has only to lower the wheels of the bogie of the trailer by operating the hand-wheel or like means which by means of the shaft *c* and the universal joint rotates the screw G, until the screw G is unable to rotate any more owing to the fact that the nut E of the joint of the connecting rods B, B' come against the abutment block M; the driver then removes the pin T fixing the pole O in position and holds by means of the connecting rod W the hooks U in the raised position. Nothing now fixes the pole or the rollers of the bogie of the trailer in position and the trailer is therefore disconnected as soon as the driver causes the tractor to move forward. It should be observed that all the operations either for connecting or disconnecting the trailer and the tractor are effected without the driver having to leave his seat.

Figure 7:
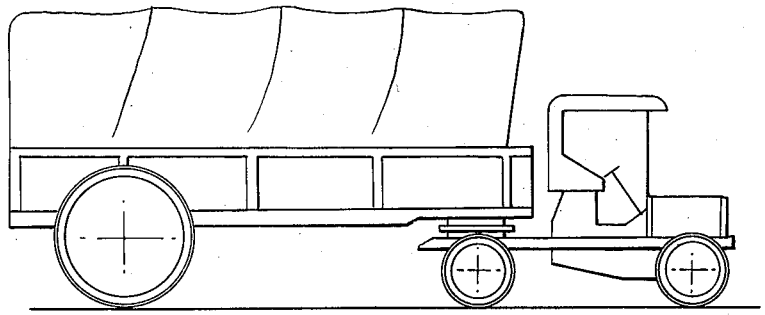
Figs. 7, 8 and 9 illustrate applications of the invention to vehicles of various types employed as trailers.
Figure 8:
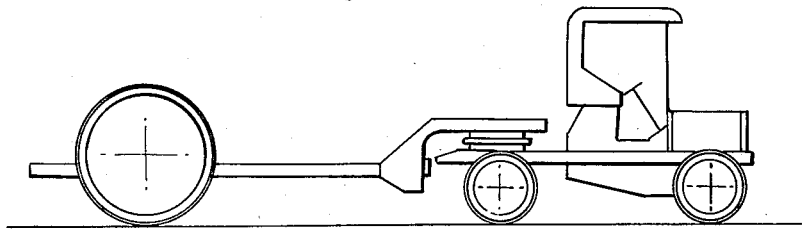

Figs. 7 and 8 show that it is possible to construct the bogie part of the trailer, according to the present invention, in such a way that it can be used as well in the case of a trailer with a flat body or frame (Fig. 7) as in the case of a trailer with a low body or frame and a raised fore-part (Fig. 8).

Figure 9:
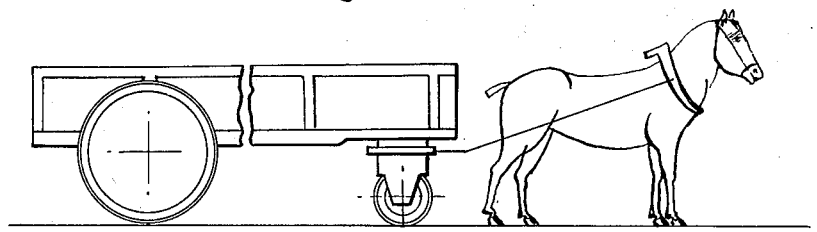

Fig. 9 shows that the disconnected trailer may even be used for animal traction if desired.

We claim:

1. In a combination of tractor and trailer, adapted to form a six-wheeled vehicle when connected, a stable bogie-part under the front end of the trailer-frame, comprising a plate-casing provided with a pair of lateral carrier-rollers and a direction pole such as employed for animal traction, a tractor frame having longitudinal members formed with downwardly inclined rear ends adapted to engage under said carrier-rollers on connection; lateral rollers, secured to the inner faces of said inclined rear ends, for guiding the aforesaid casing into position between them on engagement of the two vehicles; means for the automatic alignment of the two vehicles on connection, consisting of a funnel-like casting carried by the tractor-frame and adapted to engage the aforesaid direction-pole; stop-hooks fixed on the aforesaid longitudinal members adjacent their inclined rear-ends and arranged to act as abutments for the carrier-rollers of the trailer bogie-part, substantially as described.

2. In a combination of tractor and trailer, adapted to form a six-wheeled vehicle when connected, a trailer having a stable-bogie-part comprising a plate casing provided with lateral carrier-rollers and a direction pole and having the top-side formed as a platform fitted with means for the pivotal connection of the bogie-part to the frame of the trailer; means on the tractor for engaging said trailer bogie-part and supporting the carrier-rollers thereof; and a device for raising and lowering the wheels of such trailer bogie vertically, enclosed within aforesaid plate-casing and comprising two sets of lower connecting rods carrying the wheel axle at their lower ends and two sets of upper connecting rods having their upper-ends pivotally connected to the underside of the platform of the bogie-part, two parallel-pivot pins passing through and joining the free adjacent ends of the upper and lower connecting rods of the two respective sets and having their central portions formed as two nuts threaded each in a different direction, a rotatable screwed rod threaded in opposite directions from the centre towards the ends, extending through said two nuts and in positive engagement with the threads thereof, whereby on said rod being rotated the distance between the two pivot-pins at the two points of connection of upper and lower connecting rod sets will be modified, and bearings for the ends of the wheel-axle and of aforesaid screwed rod, slidably mounted in vertical guiding slots of the plate-casing, substantially as described.

3. In a tractor and trailer adapted to form a six-wheeled vehicle when connected, a trailer having a stable bogie-part comprising a plate-casing provided with lateral carrier-rollers and a traction pole; a tractor-frame having inclines formed at the rear-ends of its longitudinal members and adapted to engage under aforesaid carrier-rollers on the back part of the tractor engaging the trailer bogie for connection; means for securing the bogie-part of the trailer in position in relation to the tractor on connection being completed, comprising a suitably positioned hole in the tractor frame, an eye at the end of the trailer direction pole, and a removable pin for passing through both the said hole and the said eye when they register with one another, in combination with fixed hooks on the tractor-frame longitudinal members, adapted to stop the carrier-rollers of the trailer bogie-part at the upper end of the aforesaid inclines and in the vertical plane of the rear wheel axle of the tractor, movable spring-controlled hooks pivotally secured to the longitudinal members of the tractor frame and adapted to be lifted against the action of their springs by the carrier-rollers of the front end of the trailer and to retain same in position under the aforesaid fixed hooks; and means, operated from a position within reach of the driver, for effecting the disengagement of aforesaid spring-controlled hooks, substantially as described.

4. In a combination of tractor and trailer adapted to form a six-wheeled vehicle when connected, according to claim 2, means enabling the driver to rotate the screwed rod of the device for raising and lowering the wheels of the trailer bogie from his seat, comprising a longitudinal shaft slidably supported in a bearing sleeve pivoted to the tractor frame, in such a way as to be movable in the vertical plane of its longitudinal axis, a chain or like-wheel rigidly mounted on the front end of said shaft, suitable means whereby the said chain-wheel or the like may be rotated from a position within reach of the driver's hand, a square portion at the back-end of the said longitudinal shaft, a funnel-like casting rigidly fixed on the front end of the screwed rod of the bogie part of the trailer and adapted on engagement with the aforesaid square portion to form a universal joint therewith, and a spring coiled round a portion of the aforesaid longitudinal shaft of the tractor and adapted to push same into engagement with the aforesaid funnel-like casting for connection, substantially as described.

In testimony thereof we signed hereunto our names.

E. COURANT.
EUG. AUBRY.